United States Patent [19]

Tokuda et al.

[11] Patent Number: 4,903,842
[45] Date of Patent: Feb. 27, 1990

[54] CONTAINER

[75] Inventors: Koichi Tokuda, Takarazuka; Kazuo Yasuda, Takatsuki; Kazuhiro Yoshida, Kobe, all of Japan

[73] Assignee: Sumitomo Bakelite Company Limited, Tokyo, Japan

[21] Appl. No.: 248,281

[22] Filed: Sep. 22, 1988

[30] Foreign Application Priority Data

| Mar. 23, 1987 | [JP] | Japan | 62040916 |
| Jul. 9, 1987 | [JP] | Japan | 62104513 |
| Jul. 21, 1987 | [JP] | Japan | 62110605 |
| Aug. 4, 1987 | [JP] | Japan | 62118867 |

[51] Int. Cl.$^4$ .................. B65D 17/00; B65D 1/24
[52] U.S. Cl. .................. 206/604; 206/222; 206/469; 206/568; 206/602; 229/120.09; 229/123.1; 229/123.2; 229/125.35
[58] Field of Search ............. 229/123.1, 123.2, 120.07, 229/120.09, 125.35; 206/568, 469, 628, 604, 219, 222, 602; 220/23.8

[56] References Cited

U.S. PATENT DOCUMENTS

| 2,973,087 | 2/1961 | Rohdin | 206/469 |
| 3,302,856 | 2/1967 | Thompson et al. | 206/604 |
| 3,472,368 | 10/1969 | Hellstrom | 206/469 |
| 3,545,934 | 12/1970 | Dryden et al. | 206/568 |
| 3,941,248 | 3/1976 | Moser et al. | 206/602 |
| 4,209,126 | 6/1980 | Elias | 229/123.2 |
| 4,493,574 | 1/1985 | Redmond et al. | |
| 4,611,715 | 9/1986 | Redmond | |
| 4,781,294 | 11/1988 | Croce | 206/604 |
| 4,790,429 | 12/1988 | Fokushima | 206/469 |

FOREIGN PATENT DOCUMENTS

| 1382148 | 11/1964 | France | 220/23.8 |
| 5322786 | 2/1978 | Japan | |
| 61196990 | 12/1986 | Japan | |

Primary Examiner—Stephen P. Garbe
Attorney, Agent, or Firm—Browdy and Neimark

[57] ABSTRACT

A container from which its contents can be readily taken out by a simple one-hand finger operation, is provided. The container comprises a lid and a container main body and is sealed at least at its peripheral flange. The container main body can be bent outwardly, and it comprises two contents-holding portions which are divided by the portion for bending and which are designed such that when the container main body is bent these two portions may be pressed by each other. The lid comprises at least a monoaxially oriented film. The lengthwise direction of the portion for bending coincides with the direction of orientation of the monoaxially oriented film. A non-sealed portion is provided at an edge portion of the peripheral flange coincident with at least one end of the portion for bending, and at least two slit lines for initiating tear are provided in a part of the lid which constitutes the non-sealed portion.

17 Claims, 11 Drawing Sheets

CONTAINER

FIELD OF THE INVENTION

This invention relates to a pack type container for containing foods such as dressing, jam, milk, etc., or other materials, which is characterized by its structure that allows complete ejection of its content by a simple one-hand finger operation with no fear of soiling the user's fingers.

BACKGROUND OF THE INVENTION

Figure 7:
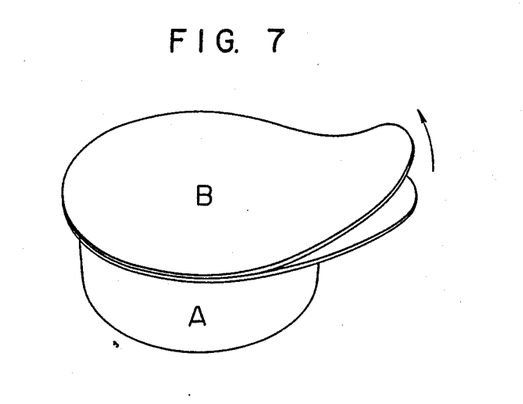
FIGS. 7, 8 and 8' are the diagrammatic perspective views of the conventional containers.
Figure 8:
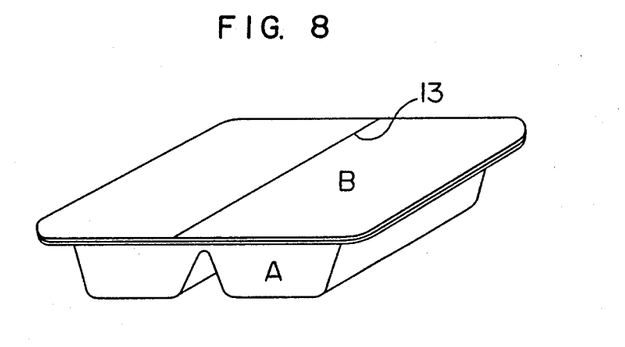

As pack containers from which the contents can be easily taken out, there are known a type of container in which, as shown in FIG. 7, the lid (B) is peeled off from the container body (A), and another type of container in which, as shown in FIGS. 8 and 8', the container body (A) can be bent outwardly and is divided into two content-holding portions designed such that they may be pressed by each other when the container body is bent, and furthermore a slit line (13) is provided across the lid (B) so that the lid can be ripped along said slit line. However, the former type of container has the possibility of soiling the user's fingers since the contents (C) are liable to spatter out when the lid (B) is peeled off, and moreover in case the contents comprise a viscous substance, it is impossible to take out the contents entirely from the container. The containers of the latter type, whose examples are disclosed in U.S. Pat. Nos. 3,986,640, 4,493,574, 9,611,715, etc., have the defects that they are poor in barrier properties and also the materials to be contained therein are limited to certain specific ones, since the lid usable therefor is confined to a hard sheet made of a brittle single material such as hard polyvinyl chloride, polystyrene and the like because in the case of this type of containers the lid must be torn along the slit line (13) while bending the container body outwardly. Further, since tearing of the lid and ejection of the contents are conducted at the same time, the contents tend to spatter out and be scattered about on peel-off of the lid, causing soiling of the environment and the user's fingers.

Moreover, this type of containers, with their lid made of a rigid sheet and provided with a slit line, often suffer from breakage of the lid under impact or the like in the course of distribution. In order to avoid this, it is necessary to double-package the container with a firmer and impact-resistant packaging material, and since such a container has a hard corner because of using a rigid sheet, there is a fear that the user's fingers would be cut when they contact strongly with the corner.

Further, in these conventional containers, in case it is desired to use two kinds of contents such as two different kinds of seasonings, for example, soy sauce and mustard, when taking a specific food such as a Chinese pie, it is necessary to take out said two substances from the respective containers. It has thus been impossible to take out and use two different substances, such as soy sauce and mustard, at the same time or separately by a single opening operation with a single container.

SUMMARY OF THE INVENTION

An object of the present invention is to provide a pack type container which is free of said problems of the conventional container, and which is capable of being opened by a simple one-hand finger operation to allow complete ejection of the contents, and furthermore which has a high degree of freedom for the selection of material of the container main body and the lid.

Another object of this invention is to provide said type of container which is free of said prior art problems, which is capable of completely discharging two different kinds of contents simultaneously by a single opening operation, and which is high in degree of freedom for the selection of material of the container main body and the lid.

It is still another object of this invention to provide said type of container from which two different kinds of contents can be completely taken out simultaneously or separately by a simple opening operation without inviting said problems of the conventional containers and which has a high degree of freedom for the selection of material of the container main body and the lid.

The container provided according to this invention comprises a lid and a container main body and is sealed at least at its peripheral flange. The container main body can be bent outwardly, and by the portion for bending it is divided into two contents-holding portions designed such that when the container main body is bent said two portions may be pressed by each other. The lid comprises at least one mono-axially oriented film arranged such that its direction of orientation will coincide with the lengthwise direction of the portion for bending. A non-sealed portion is provided at an edge portion of the peripheral flange coincident with at least one end of the portion for bending. Further, at least two slit lines for initiating tear are provided in a part of the lid which constitutes the non-sealed portion.

The container according to this invention includes four preferred embodiments.

In the first preferred embodiment, the container is sealed only at its peripheral flange, and the two content-holding portions are in communication with each other through a space formed between the portion for bending of the container main body and the lid. The container is provided with two slit lines for starting a tear in the part of the lid which constitutes the nonsealed portion.

The first object of the present invention can be attained by a container of this embodiment. That is, according to this embodiment, there is provided a pack type container which is free of the problems of the conventional containers as mentioned above, and which is capable of completely ejecting its contents by a simple one-hand finger opening operation, and which has a high degree of freedom for the selection of material of the container main body and the lid.

In the second preferred embodiment, not only is the container sealed at its peripheral flange but also the portion for bending of the container main body is sealed to the lid, and the two contents portions are perfectly separated from each other to constitute two independent compartments. Further, two slit lines for starting tear are provided in the part of the lid which constitutes the non-sealed portion, and the distance between the two slit lines is larger than the width of the sealed section of the portion for bending of the container main body.

The second object of the present invention can be accomplished by a container of this embodiment. That is, according to this embodiment, there is provided a container which is free of the problems of the conventional containers, which is capable of completely ejecting two different kinds of contents simultaneously by a single opening operation, and which has a high degree of freedom for the selection of material of the container main body and the lid.

In the third preferred embodiment, not only is the container sealed at its peripheral flange but also the portion for bending of the container main body is sealed to the lid, whereby the two contents-holding portions are perfectly separated from each other to constitute two independent compartments, and there are provided three slit lines for starting tear in the part of the lid which constitutes the non-sealed portion, the slit lines being so arranged that the distance between the slit lines of both sides may be larger than the width of the sealed section of the portion for bending of the container main body.

The fourth preferred embodiment is identical with the third embodiment except that a cut groove or a line of perforations for cutting off the two compartments is provided along the center line in the lengthwise direction of the portion for bending of the container main body, which corresponds to the extended line of the central slit line.

The third object of the present invention can be realized by a container of the third or fourth embodiment. That is, according to these embodiments, there is provided a container which is free of the problems of the conventional containers, which is capable of completely discharging two different kinds of contents simultaneously or separately by a simple opening operation, and which has a high degree of freedom for the selection of material of the container body and the lid.

BRIEF DESCRIPTION OF THE DRAWINGS

In the drawings, FIG. 1'c is a diagrammatic perspective view of a modification of the 3rd embodiment.

FIGS. 3a-1 to 3a-3 show the unpacking mechanism (tearing and contents-extracting mechanisms) of the first embodiment of the container according to this invention.

FIGS. 3b-1 to 3b-3 show the unpacking mechanism of the second embodiment of the container according to this invention.

FIGS. 3c-1 to 3c-8 show the unpacking mechanism of the third embodiment of the container according to this invention.

FIGS. 3d-1 to 3d-5 show the unpacking mechanism of the fourth embodiment of the container according to this invention.

FIGS. 4a to 6a are the perspective views showing three examples of the main body of the first embodiment of the container according to this invention.

FIGS. 4b to 6b are the perspective views showing three examples of the main body of the second embodiment of the container according to this invention.

FIGS. 5'c to 6'c are the perspective views showing two examples of the main body of a modification of the third embodiment of the container according to this invention.

FIGS. 5'd to 6'd are the perspective views showing two examples of a modification of the fourth embodiment of the container according to this invention.

DETAILED DESCRIPTION OF THE INVENTION

Figure 1:
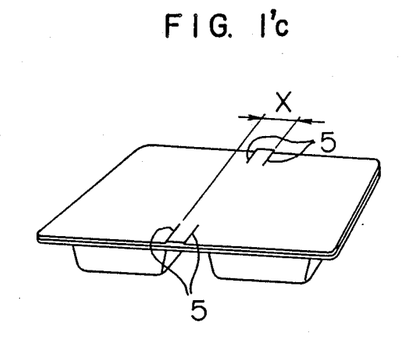
FIGS. 1a to 1d are the diagrammatic perspective views of the 1st to 4th embodiments, respectively, of the container according to this invention.
Figure 1A:
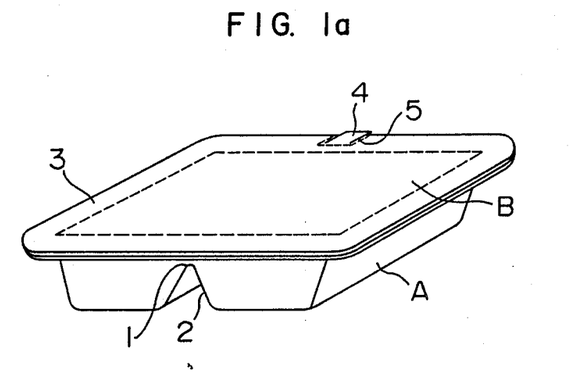
Figure 2A:
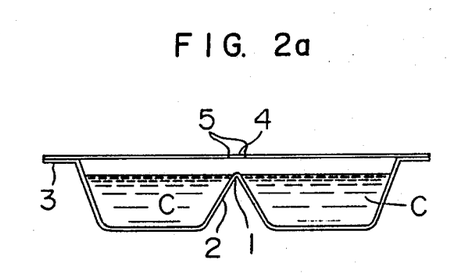
FIGS. 2a to 2d are the sectional side views of the 1st to 4th embodiments, respectively, of the container according to this invention.

The container according to the first embodiment of this invention shown in FIGS. 1a and 2a comprises a main body A shaped by vacuum molding, air-pressure molding or the like, which is made of a mono-layer or multi-layer material such as polypropylene, polyvinyl chloride, polystyrene, polypropylene/ethylene-vinyl acetate copolymer saponification product/polypropylene, polypropylene/polyvinylidene chloride/polypropylene, etc., and which has a portion for bending 1 and two content-holding portions 2 designed so that they can be pressed by each other when the container main body is bent, and a lid B comprising at least a monoaxially oriented film, which is made of polyester/monoaxially oriented polyethylene/easy-to-peel sealing material, polyvinylidene chloride-coated oriented polypropylene/monoaxially oriented polyethylene/easy-to-peel sealing material, polyester/aluminum foil/monoaxially oriented polyethylene/polypropylene, or the like. An easy-to-peel sealing material may be used for the inner layer of the container main body instead of using the easy-to-peel sealing material for the lid B.

Not only a hard sheet but also a flexible film can be used for the lid. The type of a resin usable therefor is not subjected to any specific limitation; it is possible to use usually hardly breakable polyolefin with excellent water vapor barrier property, viylidene chloride resin with excellent oxygen barrier property, ethylene-vinyl acetate copolymer saponification product or the like as a part of the lid layer structure to afford the barrier properties to the container.

This container is characterized in that the lengthwise direction of the portion for bending 1 of the main body A coincides with the direction of orientation of the monoaxially oriented film of the lid B, that a non-sealed portion 4 (the portion where the lid is not sealed to the container main body) is provided at an edge portion of the peripheral flange corresponding to an end of said portion for bending 1, and that two slit lines 5 for initiating tear are provided in a lid section constituting the non-sealed portion 4.

Figure 3A:
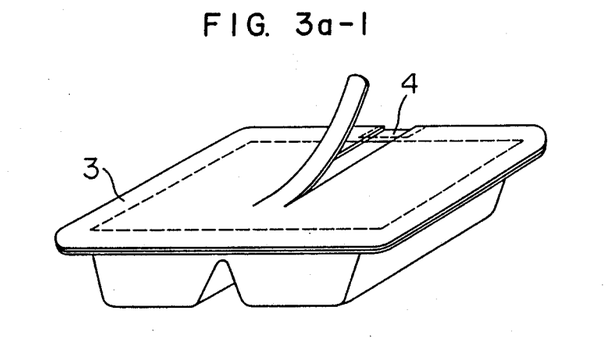
Figure 3A:
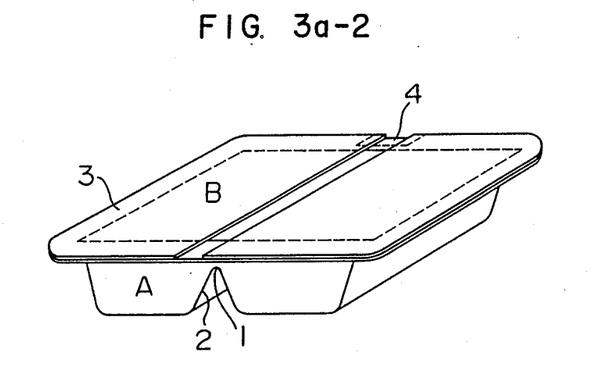
Figure 3A:
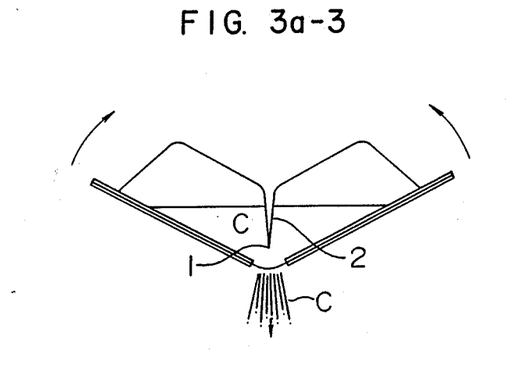

In unpacking the container, the non-sealed portion 4 of the lid B is pulled upwardly as shown in FIG. 3a-1, whereby the lid is torn in the direction of orientation and only a required part of the lid is removed as shown in FIG. 3a-2.

Then the container main body A is bent with the fingers, whereby the body A is easily bent along the portion for bending 1 and the two contents-holding portions 2 are pressed by each other, so that the content is forced out entirely with no fear of soiling the user's fingers as shown in FIG. 3a-3.

Figure 4A:
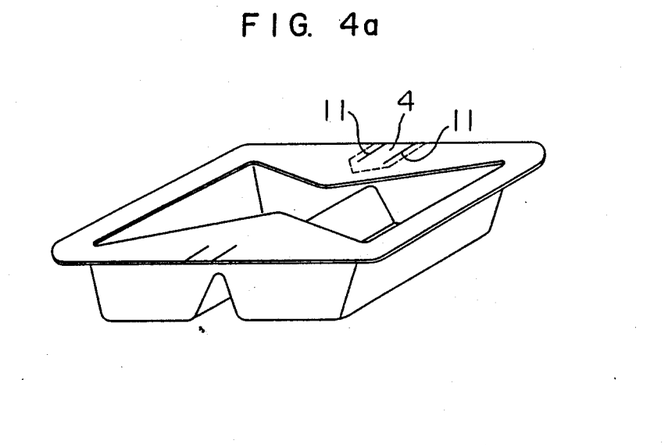

In the container of the first embodiment of this invention, only the peripheral flange is sealed (3 indicates a sealed portion) and the two content-holding portions 2 are in communication with each other through a space between the portion for bending 1 of the container main body A and the lid B, so that this container is suited for packing one kind of substance as the contents. It is especially effective for containing a viscous substance such as jam, dressing, etc. The configuration of the content-holding portions 2 may be changed as shown in FIG. 4a so that just a required amount of substance may be packed.

Figure 1B:
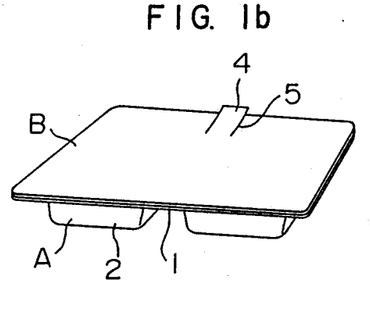
Figure 2B:
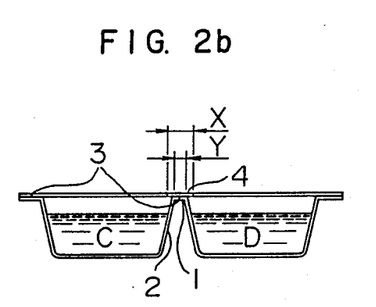

FIGS. 1b and 2b show a container according to the second embodiment of this invention. The container of this embodiment is made of materials similar to those used for the first embodiment. The structure thereof is approximately similar to that of the first embodiment.

FIGS. 3b-1 to 3b-3 show the unpacking mechanism of the container of the second embodiment. It is similar to that of the first embodiment.

In the container of this embodiment, the two contents-holding portions 2 designed to be pressed by each other upon unpacking are completely separated from each other by the sealed portion 3 to constitute two independent compartments. Therefore, it is possible to contain two different kinds of substances in the respective compartments (C and D) and to easily take out the two different substances simultaneously by one unpacking operation. Of course, the contents C and D may be the same substance.

For allowing easy ejection of the contents (C and D) in the separate compartments, two slit lines 5 for initiating tear are provided in the non-sealed portion 4. It is to be noted that the distance (X) between said slit lines is larger than the width (Y) of the sealed portion which separates the two compartments.

That is, the slit lines and the seal need to be provided so that $X>Y$, and the spaces formed by the difference between X and Y serve as outlet 6 of the contents C and outlet 7 of the contents D when the container is unpacked. Thus, it is possible with this container to completely eject out two different kinds of substances from the respective compartments by one simple unpacking operation without causing soiling of the user's fingers.

Figure 4B:
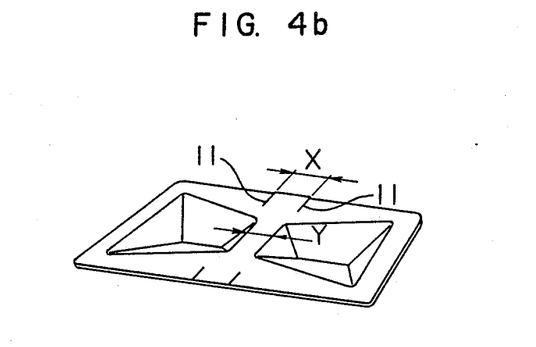

The configuration of the contents-holding portions 2 may be suitably changed as shown in FIG. 4b for packing just a required amount of substance(s).

Figure 1C:
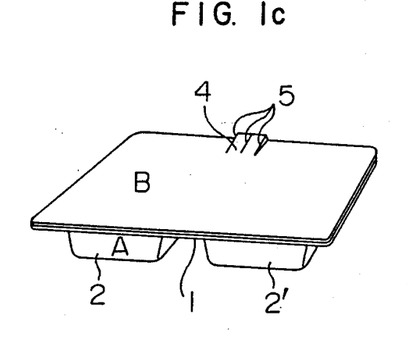
Figure 2C:
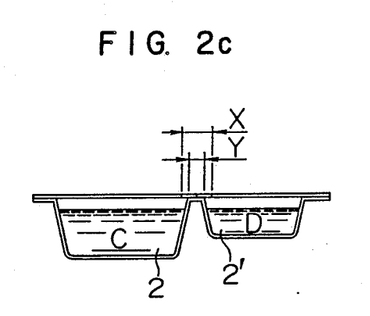

FIGS. 1c and 2c illustrate a container according to the third embodiment of this invention. The container-composing materials used in this embodiment are similar to those of the first embodiment. The structure thereof is approximately similar to that of the second embodiment. The only difference is that three slit lines for initiating tear are provided in a part of the lid constituting the non-sealed portion 4.

Figure 3B:
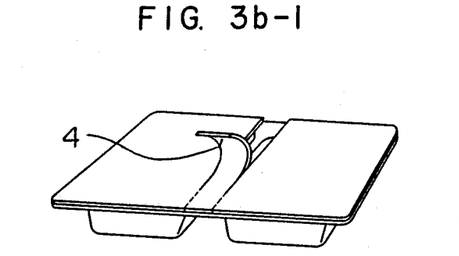
Figure 3B:
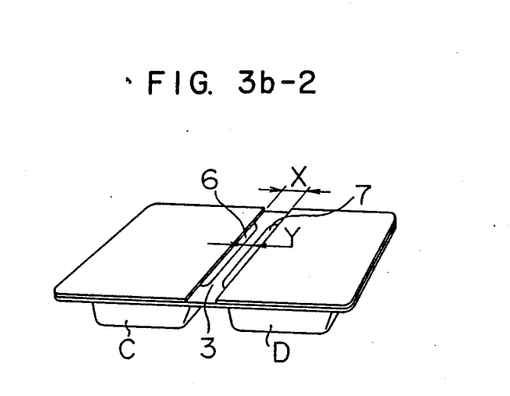
Figure 3B:
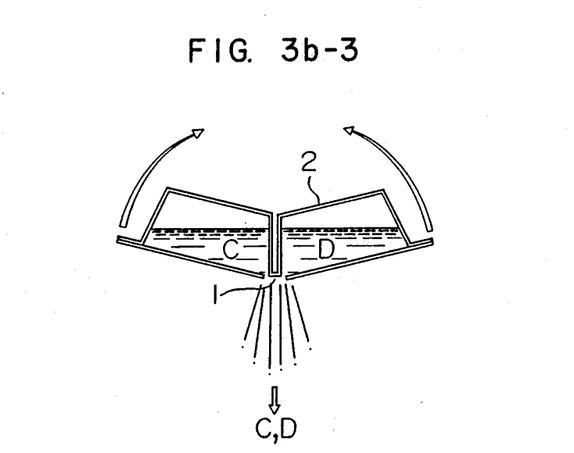

In case only the two outside ones of these three slit lines are utilized, it is possible to take out two different contents substances at the same time. In this case, the unpacking mechanism is the same as that of the second embodiment shown in FIGS. 3b-1 to 3b-3.

In case the slit line of one side and the middle one are utilized, it is possible to take out two different contents substances separately by a simple unpacking operation. The unpacking mechanism in this case is described below with reference to FIGS. 3c-1 to 3c-8.

Figure 3C:
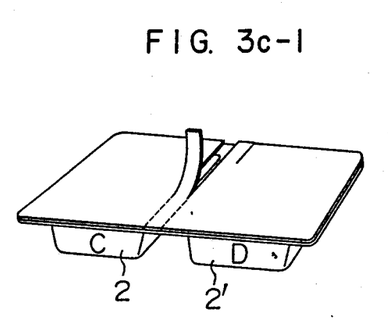
Figure 3C:
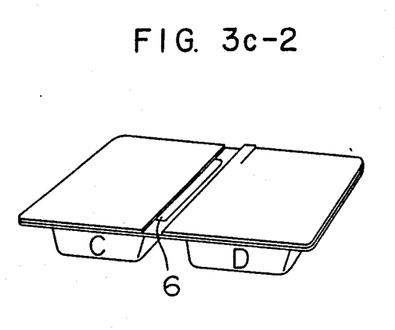

When it is desired to take out the content C alone, the part of the lid B constituting the non-sealed portion 4 which is positioned between the slit line on the content C side and the middle slit line, is pulled upwardly as shown in FIG. 3c-1, whereby the lid is torn in the direction of orientation and only a required part of the lid on the content C side is removed to open the outlet 6 as shown in FIG. 3c-2.

Figure 3C:
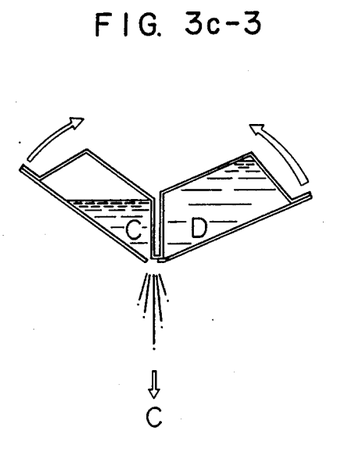
Figure 3C:
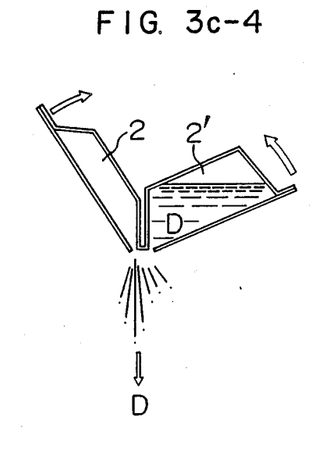
Figure 3C:
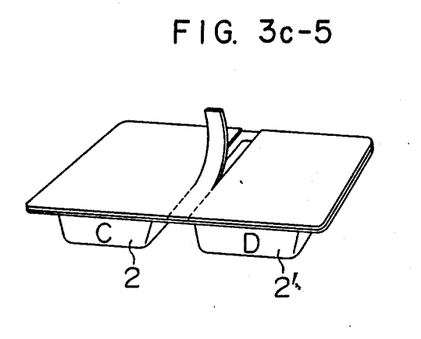
Figure 3C:
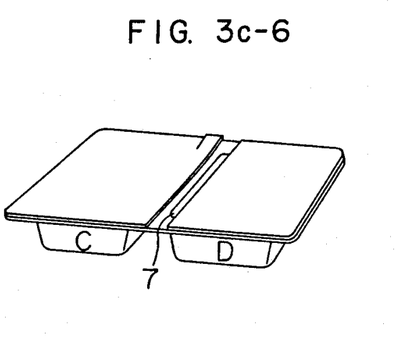
Figure 3C:
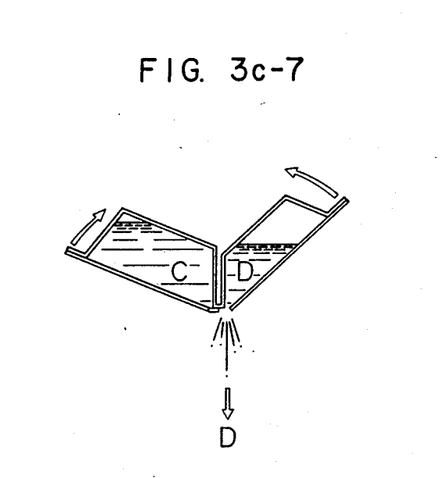
Figure 3C:
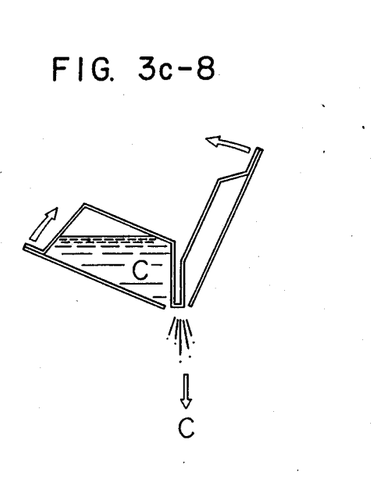
Figure 3D:
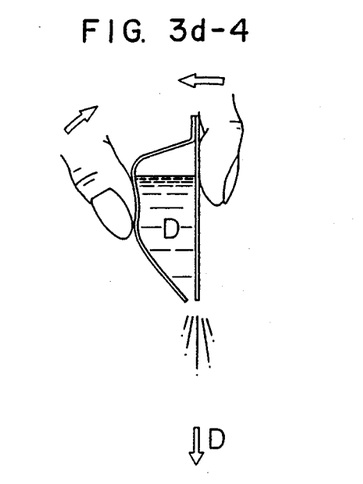
Figure 3D:
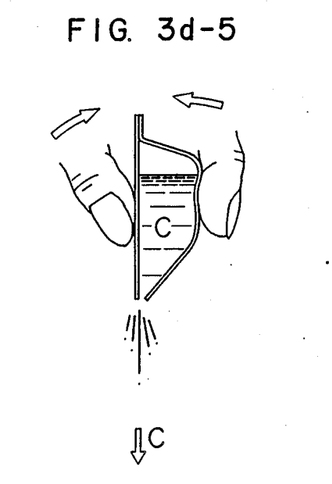
Figures 3D, 3D, 3D:
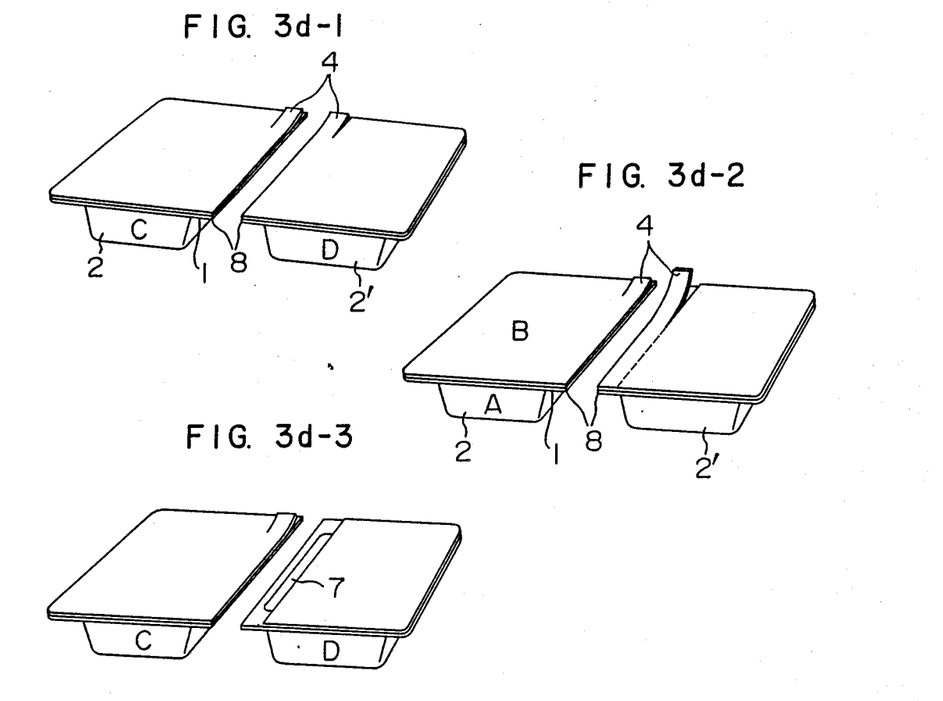

Then the container main body A is bent with the fingers. It is easily bent along the portion for bending 1 and the contents-holding portions (2 and 2') are pressed by each other as shown in FIG. 3c-3, whereby the content C alone is squeezed out completely with no fear of soiling the user's fingers.

In taking out the contents D after release of the contents C, the corresponding lid part on the contents D side is similarly removed to open the outlet 7, and then the container main body A is bent with the fingers as shown in FIGS. 3c-4, whereby the contents-holding portions 2 and 2' are pressed by each other, allowing the contents D to flow out entirely with the user's fingers kept free from soiling.

When it is desired to take out the contents D alone, the part of the lid B constituting the non-sealed portion 4 which is positioned between the slit line on the content D side and the middle slit line, is pulled upwardly as shown in FIG. 3c-5, whereby the lid is torn in the direction of orientation and only a required part of the lid on the content D side is removed to open the outlet 7 as shown in FIG. 3c-6. Thereby the contents D alone can be completely ejected as shown in FIG. 3c-7 with no fear of causing soiling of the user's fingers. This can be followed by the ejection of the contents C in the same manner as described above, as shown in FIG. 3c-8.

Figure 1D:
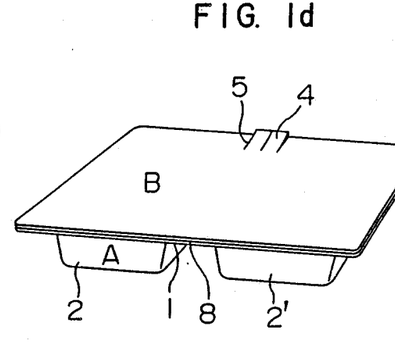
Figure 2D:
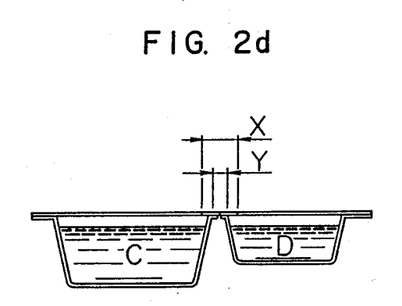

FIGS. 1d and 2d illustrate a container according to the fourth embodiment of this invention. The composing materials of this container are similar to those used in the first embodiment, and its structure is approximately similar to that of the third embodiment. The only difference is that a cut groove or a line of perforations for cutting off the two compartments is provided along the center line in the lengthwise direction of the portion for bending 1 of the container main body, which corresponds to the extended line of the middle slit line.

In this embodiment, there are provided three slit lines in a part of the lid B constituting the nonsealed portion 4 as in the container of the third embodiment. Therefore, by utilizing the two outside slit lines, it is possible to take out the two different contained substances at the same time as shown in FIGS. 3b-1 to 3b-3, and furthermore by utilizing the slit line of one side and the middle one, it is possible to take out the two different contents separately as shown in FIGS. 3c-1 to 3c-8.

In the latter case, for the sake of taking out the contents D without taking the step of proceeding from the state of FIG. 3c-3 to the state of FIG. 3c-4, the emptied portion 2 of the container is cut off from the cut groove or the line of perforations 8 provided along the center line in the lengthwise direction of the portion for bending 1, and then a necessary part of the lid on the contents D side is similarly removed to open the outlet 7 and the container main body A and the lid B are pushed by the fingers as shown in FIG. 3d-4, whereby the contents D in the portion 2' can be completely forced out with no fear of soiling the user's fingers.

Thus, the portion containing contents D can be separated and let serve as an independent container from the portion containing contents C, and the contents D can be taken out alone.

This mode of use is suited for taking out the contents D when so desired after the contents C has been taken out.

The cut groove or line of perforations 8 to be provided along the center line in the lengthwise direction of the portion for bending 1 of the main body A may be formed as a V-notch, a rectangular groove, serrations or other forms either on the outside of the container main body or on the sealing side thereof. Such a cut groove or line of perforations allows easy cutting off of the content-holding portions 2 and 2' of the container.

When it is desired to take out the contents C and the contents D separately from each other, the two container portions 2 and 2' holding the contents C and the contents D, respectively, may be cut off from each other by cutting the ut groove or the line of perforations 8 as shown in FIG. 3d-1, and then the contents (C, D) can be taken out individually from the respective holding portions (2, 2') which now form two independent containers. FIG. 3d-2 illustrates a mode of taking out the contents D. A portion of the lid B constituting the non-sealed portion 4 between the slits on the contents D side is pulled upwardly, whereby the lid is torn in the direction of orientation and the corresponding part of the lid is removed to open the outlet 7 as shown in FIG. 3d-3. Then the container main body A and the lid B are pressed together by the fingers as shown in FIG. 3d-4. As the contents-holding portion 2' is compressed, the contents D therein is forced out entirely with no fear of the user's fingers being soiled with the ejected contents substance. The contents C can be taken out similarly as shown in FIG. 3d-5.

Thus, in this case, the portion 2 holding the contents C and the portion 2' holding the contents D serve as two independent containers, and their contents can be taken out separately as desired by a simple finger operation.

FIGS. 2c and 2d show an embodiment where the contents C and D in the respective holding portions 2 and 2' are different in their volumes (the volume of contents C is more than the volume of contents D in the shown cases). Such a container is conveniently used for packing two different substances, for example, soy sauce and mustard as contents.

Figure 5:
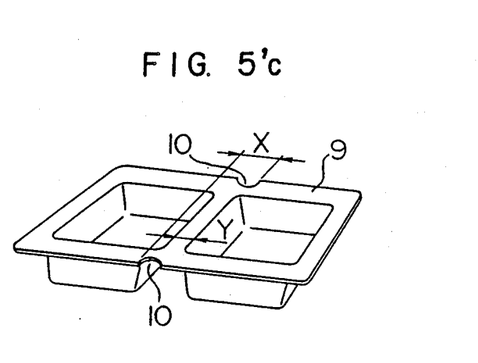
Figure 5A:
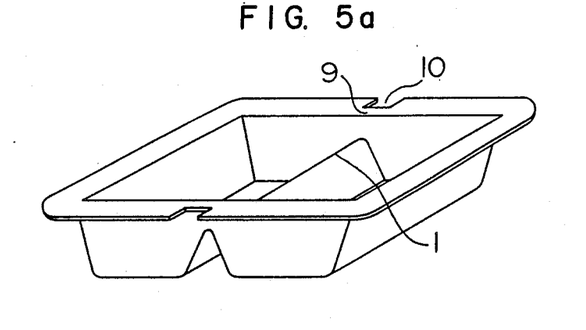
Figure 5B:
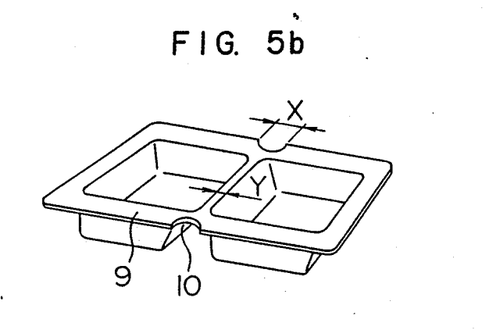
Figure 6:
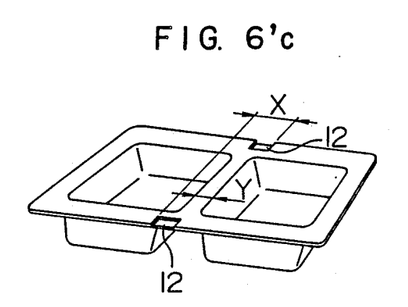
Figure 6A:
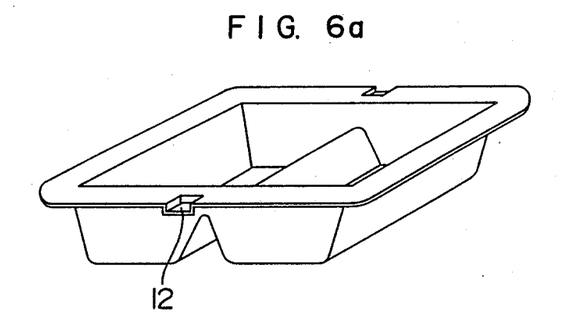
Figure 6B:
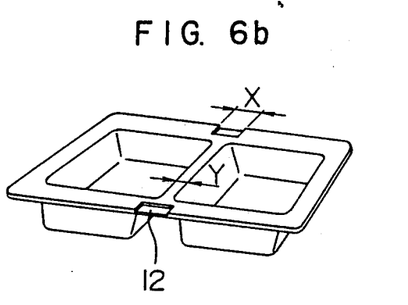

For the sake of forming non-sealed portions with the lid B, there may be provided recesses 10 as shown in FIGS. 5a-5'd, nicks 11 as shown in FIGS. 4a and 4b, or pits 12 as shown in FIGS. 6a-6'd, at the edge portions of the peripheral flange 9 corresponding to both ends of the portion for bending 1. The shape thereof may be suitably selected depending on the kind and volume of the contents C and D, the material of the container main body A and the material of the lid B.

FIG. 1'c shows a modification of the container according to the third embodiment of this invention. The main body of this container has a structure as shown in FIG. 5'c or 6'c. In this container, the main body is sealed with the lid at the portion for bending in addition to the peripheral flange, whereby the two contents-holding portions are perfectly separated from each other to constitute two independent compartments. Furthermore, the non-sealed portions are provided at edge portions of the flange corresponding to both ends of the portion for bending and in contact with and at both sides of the center line in the lengthwise direction of the portion for bending. There are also provided two slit lines for initiating tear in the lid section constituting each of said non-sealed portions (there are provided four slit lines in all). Moreover, the distance between the two slit lines not contacting the center line in the lengthwise direction of the portion for bending is larger than the width of the sealed section of the portion for bending. Thus, this container is suited for taking out two different contained substances at the same time or separately.

What is claimed is:

1. A pack type container from which contents contained therein can be easily removed, comprising a lid and a main body, said lid and main body being sealed at least at a peripheral flange of the main body, said main body being bendable outwardly and divided by the portion for bending into two contents-holding portions designed such that they may be pressed together when the container main body is bent, said lid comprising at least one monoaxially oriented film whose direction of orientation coincides with the lengthwise direction of said portion for bending, wherein a non-sealed portion is provided at an edge portion of the flange corresponding to at least one end of said portion for bending, and at least two slit lines for initiating tear are provided in a part of the lid which constitutes said non-sealed portion.

2. A container according to claim 1, wherein the container is sealed only at the peripheral flange of the main body; said two contents-holding portions are in communication with each other through a space between the portion for bending of the main body and the lid; and two slit lines for initiating tear are provided in the part of the lid which constitutes said non-sealed portion.

3. A container according to claim 2, wherein the lid is composed of a multi-layer material containing at least one monoaxially oriented film, which consists of polyester/monoaxially oriented polyethylene/easy-to-peel sealing material, or polyvinylidene chloride-coated oriented polypropylene/monoaxially oriented polyethylene/easy-to-peel sealing material, or polyester/aluminum foil/monoaxially oriented polyethylene/polypropylene.

4. A container according to claim 1, wherein the main body is composed of a mono-layer or multi-layer material consisting of polypropylene, polyvinyl chloride, polystyrene, polypropylene/ethylene-vinyl acetate copolymer saponification product/polypropylene, or polypropylene/polyvinylidene chloride/polypropylene.

5. A container according to claim 2, wherein the main body is composed of a mono-layer or multi-layer material consisting of polypropylene, polyvinyl chloride, polystyrene, polypropylene/ethylene-vinyl acetate copolymer saponification product/polypropylene, or polypropylene/polyvinylidene chloride/polypropylene.

6. A container according to claim 1, wherein the main body is sealed with the lid at the portion for bending in addition to the peripheral flange, whereby the two content-holding portions are completely separated from each other to constitute two independent compartments; and the distance between the two slit lines is larger than the width of the sealed section of the portion for bending.

7. A container according to claim 6, wherein the lid is composed of a multi-layer material containing at least one monoaxially oriented film, which consists of polyester/monoaxially oriented polyethylene/easy-to-peel sealing material, or polyvinylidene chloride-coated oriented polypropylene/monoaxially oriented polyethylene/easy-to-peel sealing material, or polyester/aluminum foil/monoaxially oriented polyethylene/polypropylene.

8. A container according to claim 6, wherein the main body is composed of a mono-layer or multi-layer material consisting of polypropylene, polyvinyl chloride, polystyrene, polypropylene/ethylene-vinyl acetate copolymer saponification product/polypropylene, or polypropylene/polyvinylidene chloride/polypropylene.

9. A container according to claim 1, wherein the main body is sealed with the lid at the portion for bending in addition to the peripheral flange, whereby the two contents-holding portions are completely separated from each other to constitute two independent compartments; three slit lines comprising two outer slit lines and one inner slit line for initiating tear are provided in the part of the lid which constitutes said non-sealed portion; and the distance between the outer slit lines is larger than the width of the sealed section of the portion for bending.

10. A container according to claim 9, wherein the lid is composed of a multi-layer material containing at least one monoaxially oriented film, which consists of polyester/monoaxially oriented polyethylene/easy-to-peel sealing material, or polyvinylidene chloride-coated oriented polypropylene/monoaxially oriented polyethylene/easy-to-peel sealing material, or polyester/aluminum foil/monoaxially oriented polyethylene/polypropylene.

11. A container according to claim 9, wherein the main body is composed of a mono-layer or multi-layer material consisting of polypropylene, polyvinyl chloride, polystyrene, polypropylene/ethylene-vinyl acetate copolymer saponification product/polypropylene, or polypropylene/polyvinylidene chloride/polypropylene.

12. A container according to claim 9, wherein a cut groove or a line of perforations for separating the two compartments is provided along a line through the center of said container in the lengthwise direction of the portion for bending of the container main body, which corresponds to the extended line of the middle slit line.

13. A container according to claim 12, wherein the lid is composed of a multi-layer material containing at least one monoaxially oriented film, which consists of polyester/monoaxially oriented polyethylene/easy-to-peel sealing material, or polyvinylidene chloride-coated oriented polypropylene/monoaxially oriented polyethylene/easy-to-peel sealing material, or polyester/aluminum foil/monoaxially oriented polyethylene/polypropylene.

14. A container according to claim 12, wherein the main body is composed of a mono-layer or multi-layer material consisting of polypropylene, polyvinyl chloride, polystyrene, polypropylene/ethylene-vinyl acetate copolymer saponification product/polypropylene, or polypropylene/polyvinylidene chloride/polypropylene.

15. A container according to claim 1, wherein the lid is composed of a multi-layer material containing at least one monoaxially oriented film, which consists of polyester/monoaxially oriented polyethylene/easy-to-peel sealing material, or polyvinylidene chloride-coated oriented polypropylene/monoaxially oriented polyethylene/easy-to-peel sealing material, or polyester/aluminum foil/monoaxially oriented polyethylene/polypropylene.

16. A container according to claim 1, wherein the main body is sealed with the lid at the portion for bending in addition to the peripheral flange, whereby the two contents-holding portions are completely separated from each other to constitute two independent compartments; two non-sealed portions are provided at edge portions of the flange corresponding to both ends of said portion for bending and in contact with and at both sides of a line through the center of said container in the lengthwise direction of said portion for bending; two slit lines for initiating tear are provided in the part of the lid which constitutes each of said non-sealed portions, said slit lines being four in all; and the distance between the two slit lines not in contact with the center line in the lengthwise direction of said portion for bending is larger than the width of the sealed section of said portion for bending.

17. A container according to claim 16, wherein a cut groove or a line of perforations for cutting off the two compartments is provided along the center line in the lengthwise direction of the portion for bending of the container main body.

* * * * *